United States Patent [19]

Kistler et al.

[11] Patent Number: 4,522,066
[45] Date of Patent: Jun. 11, 1985

[54] TEMPERATURE-COMPENSATED EXTENSOMETER

[75] Inventors: Walter P. Kistler; Martin D. Chinn, both of King County, Wash.

[73] Assignee: Kistler-Morse Corporation, Redmond, Wash.

[21] Appl. No.: 498,042

[22] Filed: May 25, 1983

Related U.S. Application Data

[63] Continuation-in-part of Ser. No. 377,819, May 13, 1982, abandoned.

[51] Int. Cl.$^3$ .............................................. G01B 7/18
[52] U.S. Cl. ...................................... 73/781; 73/855; 73/862.66; 338/6
[58] Field of Search ................. 73/766, 767, 763, 774, 73/781, 782, 855, 862.63, 862.65, 862.66; 33/147 D, 148 D, DIG. 13; 338/6

[56] References Cited

U.S. PATENT DOCUMENTS

| | | | |
|---|---|---|---|
| 3,001,291 | 9/1961 | Sjostrom | 338/6 X |
| 3,832,898 | 9/1974 | Randolph, Jr. | 73/862.65 |
| 3,995,476 | 12/1976 | Hoffman | 73/767 |
| 4,058,005 | 11/1977 | Barnett | 338/6 X |

Primary Examiner—Charles A. Ruehl
Attorney, Agent, or Firm—Seed and Berry

[57] ABSTRACT

An extensometer having two spaced-apart mounting bases adapted to be mounted on a load-bearing structure with its axis of sensitivity intersecting the axis along which load-induced strains are generated at 45°. The extensometer includes a pair of parallel links connecting the mounting bases through respective flexure hinges. In one embodiment, one of the links is also connected to one of the bases through an intermediate flexure hinge so that the link deforms responsive to relative movement applied between the bases along the axis of sensitivity. A strain gauge mounted on this link measures the magnitude of the deformation. In a second embodiment, a strain-instrumented measurement beam extends between the two links so that it deforms responsive to pivotal movement of the links as the mounting bases move in opposite directions along the axis of sensitivity. This embodiment of extensometer may be mounted on the load-bearing structure through three or more mounting points. In order to facilitate mounting of the extensometer on a structure without pre-straining the extensometer, a rigid plate may be connected to the extensometer through a plurality of pins, each of which extends from the plate through the extensometer at each of the mounting points. The pins terminate in a point and they are biased against the structure by a threaded fastener extending from the plate, through the extensometer, and into the structure.

38 Claims, 13 Drawing Figures

TEMPERATURE-COMPENSATED EXTENSOMETER

CROSS-REFERENCE TO RELATED APPLICATION

This application is a continuation-in-part of application Ser. No. 377,819, filed May 13, 1982, now abondoned.

TECHNICAL FIELD

This invention relates to strain-measuring devices and, more particularly, to a device for measuring the strain in a load-supporting member in a manner which minimizes the effects of variations in the temperature of the support member.

BACKGROUND ART

The weight of materials contained in large storage vessels is often measured by attaching strain sensors or "extensometers" to the support structure of such vessels. By measuring the amount of compression in such support structures as material is placed in the vessel, the weight of such material can be determined.

In general, the strain sensor or extensometers used in such weighing systems measure strain in only one dimension, normally along the longitudinal axis of the support structure. An example of a strain sensor used for this purpose is described in U.S. Pat. No. 4,064,744. The principle disadvantage of a strain sensor of this type results from temperature-related effects on the sensors. When the temperature of the support structure increases, the support structure expands. It is, of course, undesirable for a strain sensor mounted on the support structure to respond to such expansion of the support structure since the expansion is unrelated to weight-induced strain. Therefore, extensometers or strain sensors are normally fabricated from the same material as the support structure on which they are mounted so that they will expand at the same rate as the support structure.

In weighing applications, however, even a small mismatch in the coefficients of thermal expansion, such as are incurred because of unpredictable variations in the composition of the material forming the support structure and strain sensor, or to differences in how they are fabricated, will cause noticeable errors in the measurement which cannot be easily corrected. Further errors are caused by variations in the rate at which the temperature of the support structure varies relative to the strain sensor. As a result, a temperature differential between the suport structure and strain sensor develops, thereby causing the strain sensor to generate a temperature-induced error. This error will continue as long as there exists a temperature differential between the support structure and strain sensor.

Another area of potential difficulty arises from the need to measure the stress in support structures having a curved outer surface. In the event that stress-induced strain is measured by extensometers having four mounting points, it is not possible for the four points to all lie on the curved surface.

Another difficulty encountered with extensometers arises from the need to accurately position the mounting point for the exensometers. Extensometers are often bolted to support structures through threaded bores machined in the structure. Inaccurately positioning the bores applies a pre-strain to the extensometer, thereby degrading its performance.

DISCLOSURE OF INVENTION

The primary object of the invention is to measure load-induced strains in a support member without responding to temperature-induced strains in the support structure.

Another object of the invention is to provide an extensometer which can be easily used in a variety of load-measuring applications.

It is another object of the invention to provide a system for allowing extensometers to be easily mounted on a structure without pre-straining the extensometer.

It is a further object of the invention to provide an extensometer that can be mounted on a nonplanar surface of a structure to measure the load-induced strain in that structure.

These and other objects of the invention are provided by an extensometer having first and second mounting bases receiving strains from a structure on which they are mounted. First and second spaced-apart links are connected between the mounting bases through respective flexure hinges. The flexure hinges are positioned to define a rectangle which has first axis of symmetry intersecting the first and second links, and a second axis of symmetry extending perpendicularly to the first axis of symmetry. The first mounting base is mounted on the structure through a pair of mounting points, while the second mounting base is mounted on the structure through at least one mounting point. All of the mounting points on each of the mounting bases are symmetrically positioned with respect to the second axis of symmetry. The extensometer is mounted on the load-bearing structure with the axes of symmetry intersecting the measurement axis along which load-induced strains occur at substantially 45°. Measurement means generate an electrical indication that is proportional to the strain along the measurement axis in one direction (e.g., compression) and proportional to the strain along an axis perpendicular to the measurement axis in the opposite direction (i.e., tension). As a result, the measurement means responds to load-induced strains in the load-bearing structure but is insensitive to isotropic strains. In one embodiment, one of the links is connected to one of the bases through a flexure hinge so that the link bends responsive to relative movement between the bases. A strain sensor mounted on this link measures the magnitude of the strain. In a second embodiment, a strain-instrumented measurement beam extends between the two links. The measurement beam bends responsive to pivotal movement of the links resulting from relative movement between the bases. The extensometer may be mounted on a load-bearing structure by a mounting structure including a rigid plate, a plurality of pins extending between the plate and the extensometer at respective mounting points, and a threaded fastener extending from the rigid plate, through the extensometer, and into the structure to bias the rigid plate toward the structure. Pointed projections extending from the extensometer toward the structure are thus forced against the structure by the rigid plate.

BEST MODE FOR CARRYING OUT THE INVENTION

Figure 1:
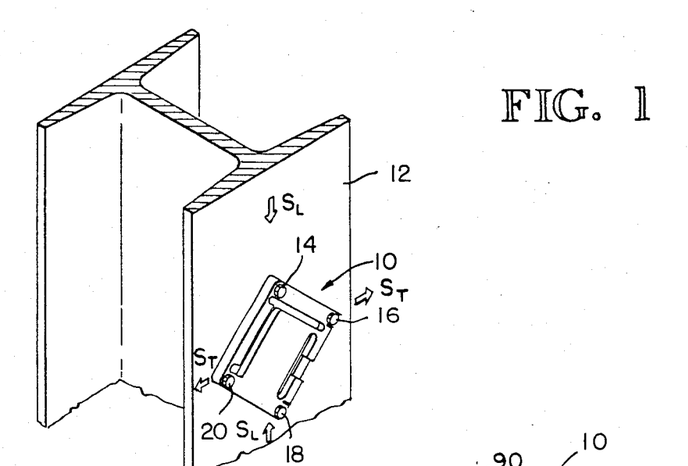
FIG. 1 is an isometric view of one embodiment of the inventive extensometer mounted on a load-supporting structure.

One embodiment of the extensometer 10, as illustrated in FIG. 1, may be mounted on an I-beam 12 forming one leg of the support structure for a large storage vessel. As material is placed in the storage vessel, the compressive strain $S_L$ applied to the I-beam 12 in a longitudinal direction increases, while the tensional strain $S_T$ applied to the beam 12 in a transverse direction also increases. The degree of load-induced strain in the I-beam 12 along either a transverse or longitudinal measurement axis is thus a measure of the weight of material in the vessel. In contrast, temperature-induced strains are isotropic in that the longitudinal and transverse strains are both of the same polarity (i.e., tension or compression). It can thus be seen that by reacting in one manner to longitudinal strains of one polarity and in the same manner to transverse strains of the opposite polarity, the extensometer 10 can respond to load-induced strains in the beam 12. Similarly, by reacting in one manner to longitudinal strains of one polarity and in the opposite manner to transverse strains of the same polarity, the extensometer 10 can be insensitive to isotropic strains in the beam 12.

Although the use of the extensometer 10 is explained with reference to this particular application, it will be understood that it may also be used in any other application in which it is desired to measure strain along a measurement axis without responding to isotropic strains.

The extensometer 10 is mounted on the I-beam 12 at four points with bolts 14–20, respectively, although it will be understood that it may be secured to the I-beam 12 by other means, such as by welding or by pointed mounts (described in greater detail below). The extensometer 10 is mounted on the I-beam with particular angular orientation, as explained in greater detail below, in order to allow the extensometer 10 to respond to load-induced strains while being insensitive to isotropic strains.

Figure 2:
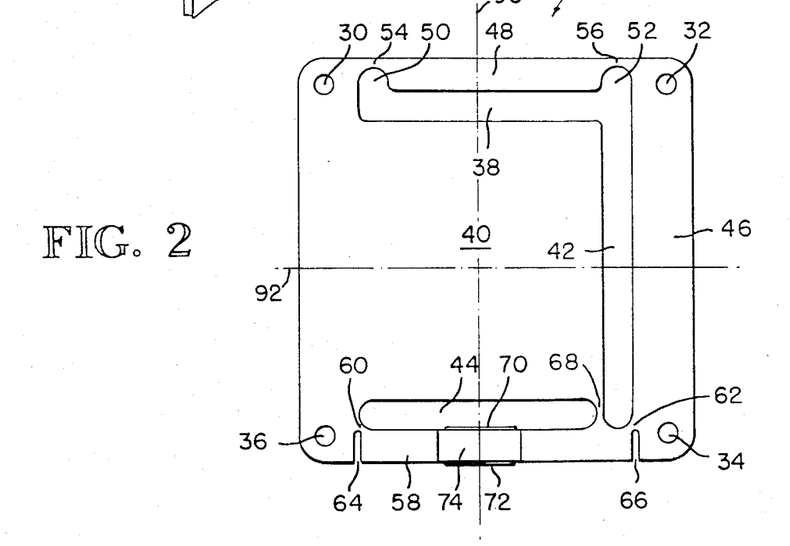
FIG. 2 is a plan view of the extensometer of FIG. 1.
Figure 3:
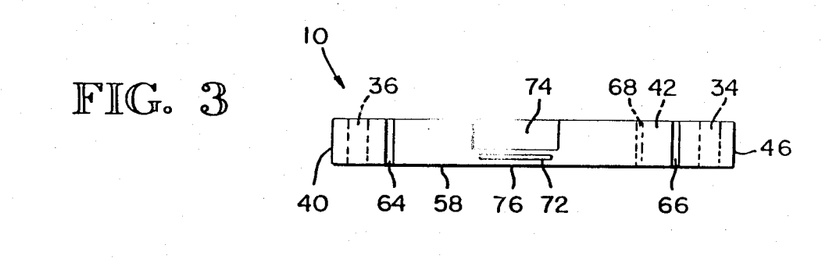
FIG. 3 is an end elevational view of the shear sensor.

The structure of the extensometer 10 is illustrated in further detail in FIGS. 2 and 3. The extensometer 10 is preferably machined from a square plate of metal. It has formed therein respective mounting holes 30–36 through which respective bolts 14–20 of FIG. 1 extend. A first slot 38 is formed along one edge of a base member 40, while a second slot 44 extends along the edge opposite the slot 38. Finally, a third slot 42 extends along an adjacent side, and intersects the first slot 38. Unlike slot 38, the slot 44 is isolated from the slot 42.

The slot 42 forms a mounting bar 46 to which motion is imparted, as explained hereinafter. The slot 38 forms a spacer arm 48 which links the base member 40 to the mounting bar 46. Semicircular extensions 50,52 of the slot 38 form respective flexure hinges 54,56, thereby making the connection between the spacer arm and the base member 40 and the mounting bar 46 highly compliant.

The slot 44 forms a measurement beam 58, which also links the base member 40 to the other end of the mounting bar 46. Like the spacer arm 48, the measurement beam 58 is connected to the base member 40 and mounting bar 46 by respective flexure hinges 60,62. However, unlike the flexure hinges 54,56, the flexure hinges 60,62 are formed by respective inwardly extending slots 64,66. As described to this point, the measurement beam 58 is substantially identical to structure and mode of operation to the spacer arm 48. However, because the slot 44 is isolated from the slot 42 rather than connected to it, as with slot 38, an intermediate flexure hinge 68 is formed, which connects the measurement beam 58 to the base member 40 intermediate the ends of the measurement beam 58.

As illustrated in greater detail hereinafter, this flexure hinge 68 causes the measurement beam 58 to pivot about that point responsive to opposed relative movement between the base member 40 and the mounting bar 46, thus causing the portion of the measurement beam 58 to the left of the flexure hinge 68 to bend about its neutral axis. This bending is measured by strain sensing means, such as conventional strain gauges 70,72, bonded to respective surfaces of the beam 58 on opposite sides of the neutral bending axis. As best illustrated in FIG. 3, the portion of the measuring beam 58 on which the strain gauges 70,72 are mounted may contain a cutout 74 to form a reduced-width portion 76. The reduced-width portion 76 concentrates the strain of the beam 58 at the strain gauges 70,72 in order to maximize the output of the sensor 10 for a given strain.

Figure 4A:
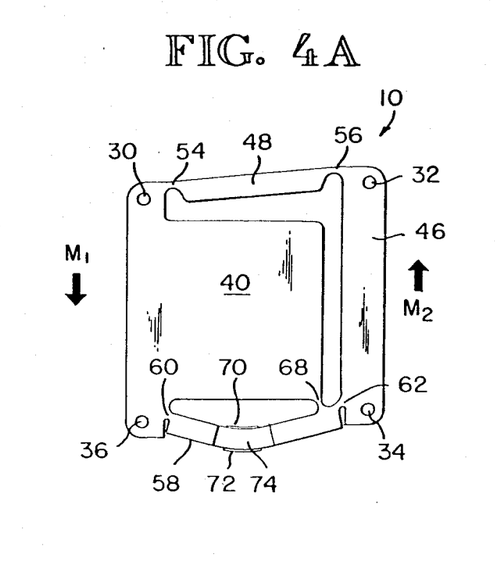
FIGS. 4A and 4B are plan views of the extensometer of FIG. 1 illustrating the deflection of the extensometer's measurement beam responsive to shear forces applied to the extensometer.
Figure 4B:
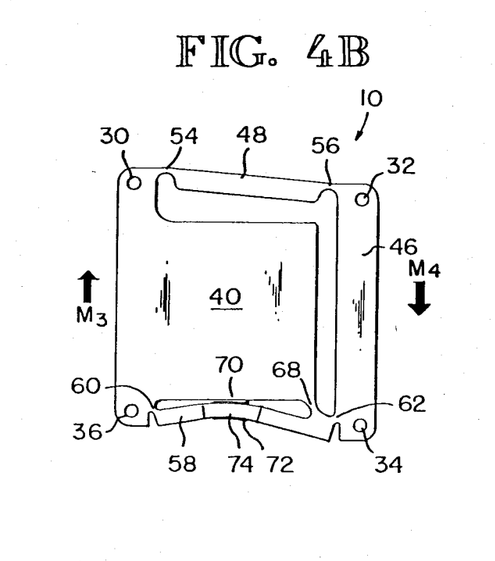

The response of the sensor 10 is illustrated for two directions of strains in FIGS. 4A and 4B. As illustrated in FIG. 4A, a downward movement $M_1$ of the base member 40 is imparted through mounting points represented by mounting holes 30,36. At the same time, movement $M_2$ of the mounting bar 46 in the opposite direction is imparted through mounting points represented by mounting holes 32,34. These opposed movements $M_1$, $M_2$ cause the mounting bar 46 to move upwardly relative to the base member 40. Movement of the mounting bar 46 relative to the base member 40 in this manner is achieved with very little force because of the high compliancy of the flexure hinges 54,56,60,62,68. Thus, the extensometer 10 does not affect the load-induced strain of the structure on which it is mounted, such as the I-beam 12 of FIG. 1. As the mounting bar 46 moves upwardly relative to the base member 40, the spacer arm 48 pivots upwardly from the base member while maintaining the upper end of the mounting bar 46 at a relatively constant distance away from the base member 40. Upward movement of the mounting bar 46 also forces the right end of the measurement beam 58 upwardly. However, because of the intermediate connection between the base member 40 and measurement beam 58 produced by flexure hinge 68, the measurement beam 58 pivots about the flexure hinge 68. This pivotal movement causes the measurement beam 58 to deflect downwardly. Relatively little force is required for this downward deflection because of the high compliance of the flexure hinge 60. In an embodiment mounting the strain gauges 70,72 on a reduced-width portion 74, the bending strain is concentrated at the strain gauges 70,72. It will thus be apparent that the connection between the base member 40 and measurement beam 58 produced by the flexure hinge 68 amplifies the response of the load cell 10 to opposed strains. In other words, placing the flexure hinge 68 closely adjacent the flexure hinge 62 causes the beam 58 to bend to a greater degree than it would if the flexure hinge 68 were farther away from the flexure hinge 62.

The response of the extensometer 10 to movements $M_3$, $M_4$ in the opposite direction, as illustrated in FIG. 4B, is as explained above with reference to FIG. 4A, except that the measurement beam 58 bends in the opposite direction.

As explained above with reference to FIG. 1, the extensometer 10 may be mounted on an I-beam that receives load-induced strains. Compressive forces applied to the I-beam 12 of FIG. 1 cause the I-beam 12 to expand transversely. Conversely, tensional forces applied to the I-beam 12 along its length, cause the I-beam 12 to contract along the transverse axis. As a result, load-induced strains in the support structure are applied to the extensometer 10 in opposite directions along two orthogonal axes. Thus, compressive longitudinal strains in the I-beam 12 are accompanied by tensional transverse strains, and tensional longitudinal strains in the I-beam 12 are accompanied by compressive transverse strains.

Figure 5:
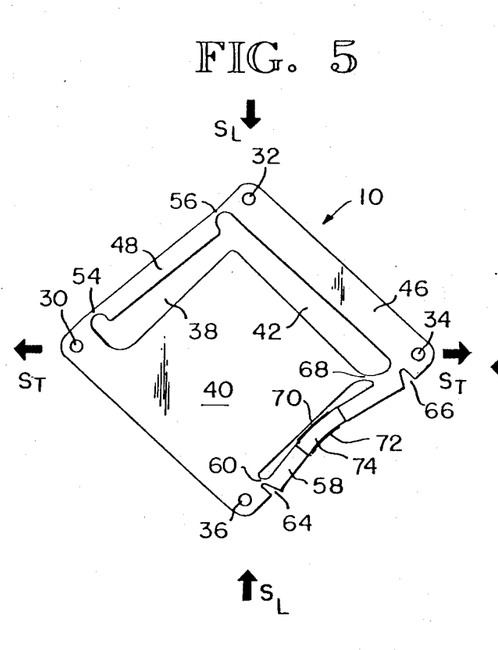
FIG. 5 is a plan view of the extensometer of FIG. 1 illustrating its response to a compressional strain along one axis and a tensional strain along an orthagonal axis, which are normally produced by loads applied to the support structure.

The longitudinal strain $S_L$ is combined with the transverse strain $S_T$ to cause the extensometer 10 to respond as illustrated in FIG. 5 and explained above. As a result, the strain gauges 70,72 provide an electrical indication of the magnitude of the load-induced strains in the I-beam 12.

Figure 6:
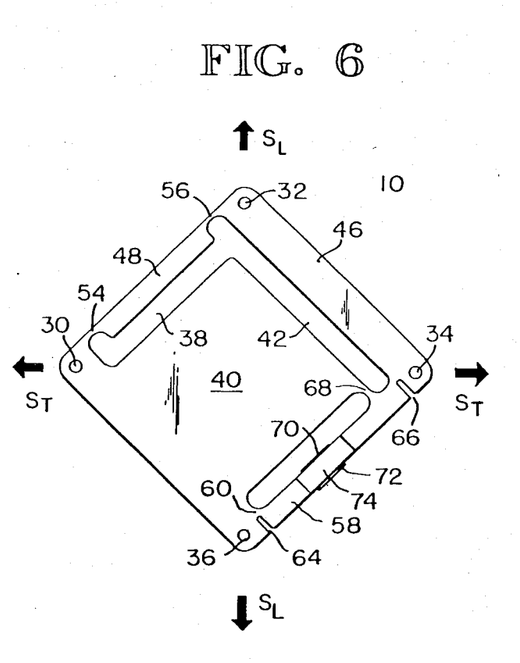
FIG. 6 is a plan view of the extensometer of FIG. 1 showing its response to isotropic strains such as are produced by temperature variations in the support structure.

As explained above with reference to FIG. 1, temperature-induced strains in a support structure, such as the I-beam 12, are isotropic in that they are equal to each other and they act in the same direction. Thus an increase in the temperature of the support structure produces a tensional longitudinal strain $S_L$ as well as an equal tensional transverse strain $S_T$. The longitudinal tension $S_L$ combined with the transverse tension $S_T$ causes the extensometer 10 to respond as illustrated in FIG. 6, in which no bending of the measurement beam 58 occurs. The strain gauges 70,72 react equally to any elongation of the measurement beam 58 produced by the transverse and longitudinal strains. The extensometer 10 therefore accurately measures load-induced strains, but is virtually insensitive to isotropic strains produced by temperature variations in the support structure or extensometer 10.

In order to ensure that the extensometer 10 is insensitive to isotropic strains while providing accurate measurement of load-induced strains, it is important to maintain a number of structural relationships with a fair degree of accuracy. First, it is important that the flexure hinges 54,56,60,62 substantially define a rectangle. This rectangle will, of course, define two axes of symmetry, the first of which 90 (FIG. 2) extends parallel to respective lines defined by mounting holes 30 and 36 and mounting holes 32 and 34. The second axis of symmetry 92 is perpendicular to the first axis of symmetry 90. In order to allow the extensometer 10 to properly respond to load-induced strains while ignoring isotropic strains, the extensometer 10 should be mounted on the load bearing structure so that the axes of symmetry intersect the "measurement axis" at 45°. The "measurement axis" is defined as an axis along which load-induced strain is to be measured. In an elongated vertical support member, the load-induced strain will normally be vertical and horizontal since a vertical compressional strain is accompanied by a horizontal tensional strain and vice versa. Thus, the extensometer 10 is normally mounted on a vertical, elongated support member, with the axes of symmetry 90,92 extending along 45°-225° and 135°-315° lines with respect to the vertical.

It is also important that the mounting holes 30,32,34,36 be properly located. This requires that the respective mounting points on the base member 40 and mounting bar 46 be symmetrically positioned with respect to the second axis of symmetry 92. Thus, in the embodiment illustrated in FIGS. 1-6, the mounting holes 30 and 36 are the same distance from the second axis of symmetry 92 as are the mounting holes 32 and 34.

Although the embodiment illustrated in FIGS. 1-6 utilizes four mounting holes, it will be understood that a single mounting hole could be used instead of two mounting holes on one side of the extensometer 10. Thus, a single mounting hole could be used instead of the mounting holes 32,34. This single mounting hole would have to be located on the second axis of symmetry 92 in order to be symmetrical thereto.

Figure 7:
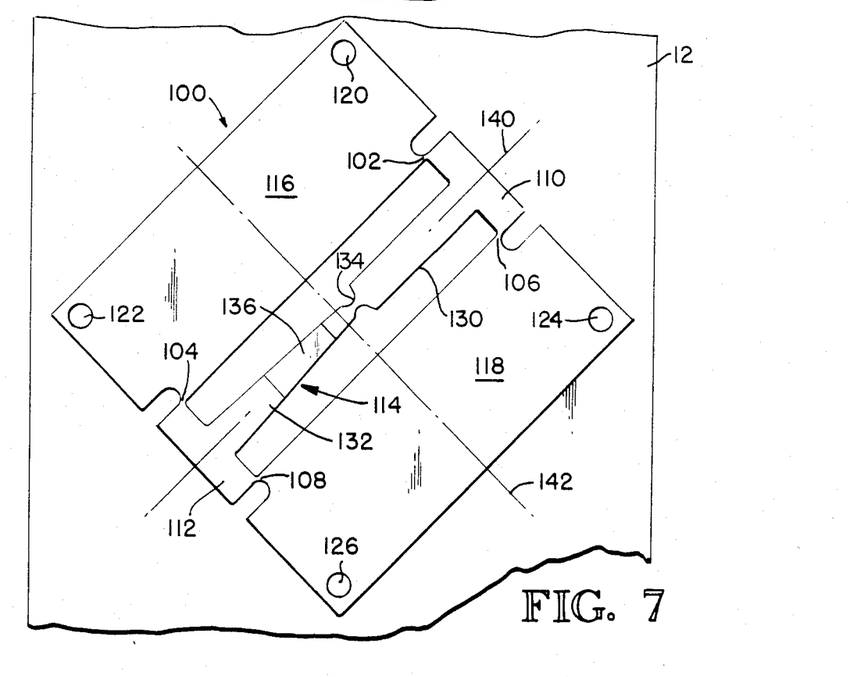
FIG. 7 is a plan view of another embodiment of the inventive extensometer mounted on a load-bearing structure.

Another embodiment of the extensometer 100 is illustrated in FIG. 7. Like the embodiment of FIGS. 1-6, the extensometer 100 has formed therein four flexure hinges 102,104,106,108 defining the four corners of a rectangle. The flexure hinges 102,106 are interconnected by a first link 110, while the flexure hinges 104,108 are interconnected by a second link 112. A measurement beam 114 extends between the respective midpoints of the pivot links 110, 112. A pair of mounting pads 116,118 are connected to the links 110,112 by the flexure hinges 102,104 and 106,108, respectively. The mounting pads 116,118 are secured to a structure by mounting holes 120,122,124,126 in order to measure the load-induced strain in the structure.

Although a variety of measurement beam structures may be used, the measurement beam 114 of the embodiment illustrated in FIG. 7 is composed of two cantilever beam sections 130,132 interconnected by a flexure hinge 134. The cantilever beam section 132 is tapered inwardly away from the link 112, and reduced thickness gauging section 136 is formed, on which conventional strain gauges are mounted. The reduced thickness of the gauging section 136 concentrates the bending of the beam 114 at the strain gauges to maximize the sensitivity of the extensometer 100. The tapered configuration of the beam section 132 minimizes the bending of the beam section 132 outside of the gauging area 136.

As with the embodiment of FIGS. 1-6, the rectangle formed by the four flexure hinges 102-108 defines two axis of symmetry. The first axis of symmetry 140 along the longitudinal axis of the measurement beam 114. Opposed movement imparted to the mounting pads 116,118 along lines parallel to the first axis of symmetry causes the measurement beam 114 to deflect, as explained hereinafter. The second axis of symmetry 142 extends perpendicularly to the longitudinal axis of the measurement beam 114. The mounting holes 120,122 and the mounting holes 124,126 are symmetrically positioned with respect to the second axis of symmetry 142. Like the embodiment of FIGS. 1-6, the extensometer 100 is mounted on a load-bearing structural member so that its axes of symmetry 140,142 intersect the measurement axis of the structural member at 45°. In this configuration, for example, a bolt extending through the mounting hole 124 and a bolt extending through the mounting hole 122 would be substantially in horizontal alignment, while a bolt extending through the mounting hole 120 would be substantially in vertical alignment with a bolt extending through the mounting hole 126. Assuming that the mounting hole 120 was on top, an increase in the compressive load applied to the structural member would cause the mounting pad 118 to move downwardly to the right and the mounting pad 116 to move upwardly to the left. The links 110,112 would then pivot clockwise, thereby causing the beam section 130 to pivot to the left and the beam section 132 to pivot to the right. This would cause the gauging section 136 to bend, thereby indicating the magnitude of the load-induced strain in the structure. In this position, the flexure hinges 102,104,106,108 would move slightly from defining a rectangle toward a parallelogram configuration.

Figure 8:
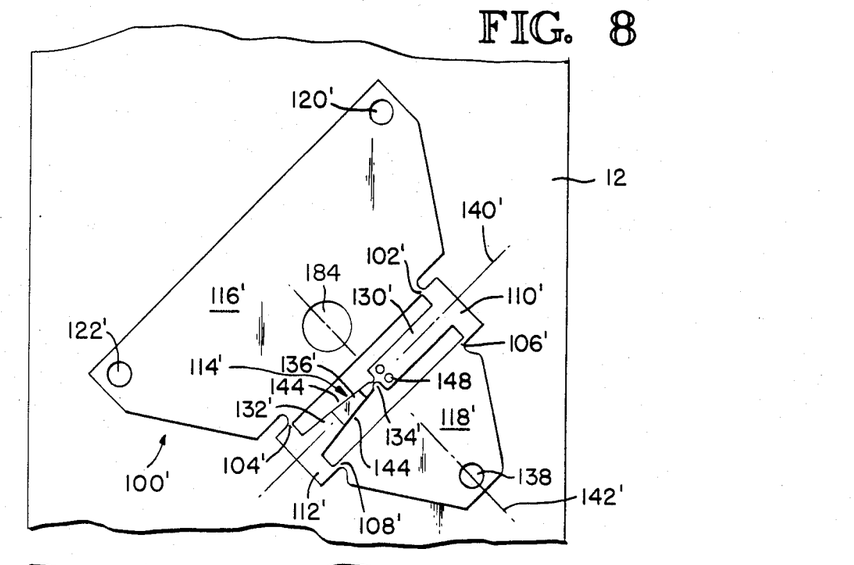
FIG. 8 is a plan view of still another embodiment of the inventive extensometer mounted on a load-bearing structure.

The embodiment illustrated in FIG. 7, as well as the embodiment illustrated in FIGS. 1-6, will provide excellent performance when mounted on a planar surface of a structural member. However, the four mounting points of these extensometers are not all capable of being in contact with a curved surface, such as on a cylindrical column. For these applicatons, an extensometer having three mounting points can be used. The three-mounting-point version is adapted from the four-mounting-point version of FIG. 7, with the recognition that the only requirement for the location of the mounting holes 120, 122, 124, and 126 in the extensometer 100 of FIG. 7 is that the mounting points, including the two mounting holes 124,126 in the extensometer 100, be symmetrically positioned with respect to the second axis of symmetry 142. A single mounting point meets this requirement as long as the mounting point lies along the second axis of symmetry 142. The resulting embodiment is illustrated in FIG. 8. The extensometer 100' of this embodiment has been numbered with the prime of the corresponding reference numerals for the extensometer 100 of FIG. 7 insofar as it functions in the same manner as that embodiment. The only substantive differences between these later embodiments are the fact that the extensometer 100' utilizes a single mounting hole 138 for the mounting pad 118. It will be observed that the mounting hole 138 is symmetrically positoned with respect to the second axis of symmetry 142' since this axis passes through the center of the mounting hole 138.

The measurement beam 114', like the measurement beam 114, includes two cantilever beam sections 130', 132' interconnected by a flexure hinge 134'. The cantilever beam section 132' contains a reduced thickness gauging section 136', as with the measurement beam 114. Conventional strain gauges 144 mounted on the gauging section 136' of the cantilever beam section 132' measure the magnitude of the opposed movement applied to the extensometer 100'. A slot 148 formed in the cantilever beam section 130' allows the effective length of the measurement beam 114' to vary responsive to deflection since the relatively thin webs connecting the section 130' to the flexure hinge 134' can deflect in either direction along the longitudinal axis of the beam 114' in response to longitudinal forces applied to the section 130' by the section 132'.

The extensometer 100' of FIG. 8 is mounted on a load-bearing structure with the same requirements as with the extensometer 100 of FIG. 7. Thus, the first and second axes of summetry 140',142' are positioned so that they intersects the measurement axis at 45°. When the extensometer 100' is mounted on a vertical column, for example, a line extending from mounting hole 122' to the mounting hole 120' will extend upwardly to intersect the vertical at 45°, a line extending from mounting hole 120' to mounting hole 138 will extend downwardly at 165° with respect to the vertical, and a line extending from the mounting hole 138 to the mounting hole 122 will extend upwardly at 285° with respect to the vertical.

Figure 9:
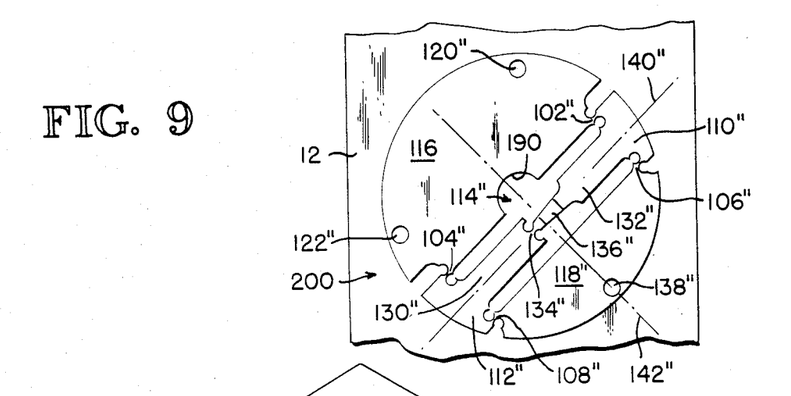
FIG. 9 is a plan view of still another embodiment of the inventive extensometer mounted on a load-bearing structure.

Another embodiment of extensometer 100" suitable for mounting on a curved surface of a load-bearing structure is illustrated in FIG. 9. This extensometer 100" is substantially similar in structure and mode of operation to the extensometer 100' of FIG. 8. Accordingly, parts of the extensometer 100" have been numbered with the double prime of the corresponding parts of the extensometer 100'. Like the earlier embodiments, the extensometer 100" includes four flexure hinges 102",104",106",108" substantially defining a rectangle with two axes of symmetry 140",142". Also, the mounting holes 120",122" for one mounting pad 116" are symmetrically positioned with respect to the axis of symmetry 142", as is the mounting hole 138" for mounting pad 118".

Figure 10:
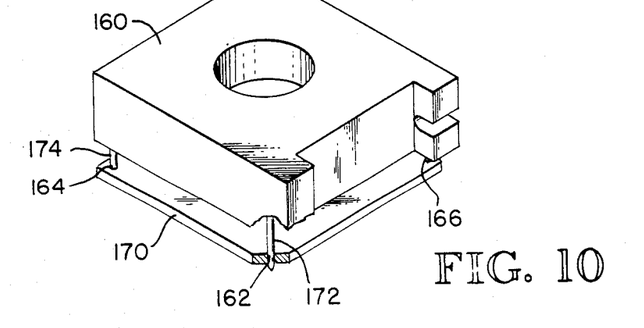
FIG. 10 is an isometric view of a mounting structure for securing an extensometer to a support structure without the need to accurately position mounting points.
Figure 11:
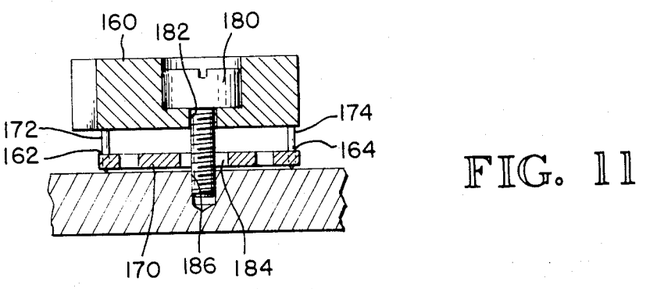
FIG. 11 is a cross-sectional view taken along the line 11—11 of FIG. 10 showing the extensometer mounted on a support structure.

As mentioned above, the extensometers 10,100,100', 100" may be secured to a load-bearing structure by welding or bolting. However, either of these techniques entails difficult problems of accurately locating the mounting points without pre-straining the extensometer. This problem may be substantially eliminated by utilizing the mounting structure illustrated in FIGS. 10 and 11. Basically, the mounting structure includes a rigid plate 160 connected to mounting points 162-168 of an extensometer 170 through respective pins 172-178. The pins 172-178 have pointed ends that extend through the extensometer and contact the surface of the load-bearing support structure 12 on which the extensometer is to be mounted. A bolt 180 extends through aligned bores 182,184 in the plate 160 and extensometer 170, respectively. The bolt is torqued into a threaded bore 186 in the structure, thereby drawing the plate 160 toward the structure. The pins 172,178 are relatively rigid along their longitudinal axis so that the points of the pins 172-178 dig into the structure. As a result, load-induced strains in the support structure are imparted to the extensometer. The pins 172-178 are fairly compliant in the transverse direction so that the mounting points of the extensometer can move regardless of the lack of movement of the plate 160. The location of the bore 184 is not critical, but it should be positioned somewhat equidistant from all pins 172-178 so that they all exert substantially the same force on the structure.

Figure 12:
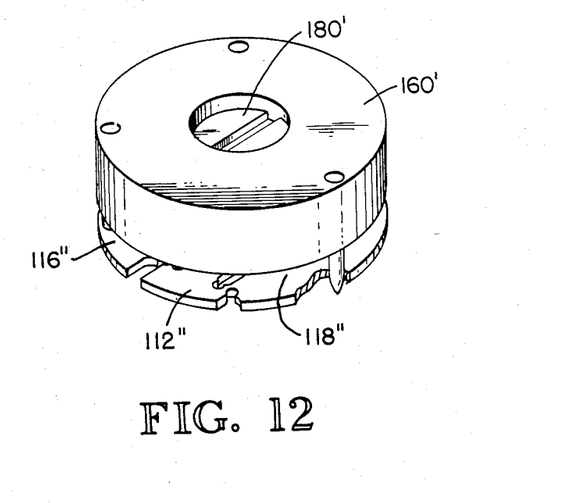
FIG. 12 is a fragmented isometric view of the extensometer of FIG. 10, including an embodiment of the mounting structure for securing the extensometer to a loadbearing structure.

The mounting system used with the extensometer 100″ of FIG. 9 is illustrated in FIG. 12. The mounting structure shown therein is substantially identical to the embodiment illustrated in FIGS. 10 and 11. Accordingly, the embodiment of FIG. 12 has been numbered with the prime of the corresponding parts of the embodiment of FIS. 10 and 11. It should be noted that the mounting bolt 180′ extends through the center cutout 190 (FIG. 9) so that it applies equal forces to each of the mounting pins.

We claim:

1. An extensometer comprising:
    first and second bases adapted for mounting on a structural member to receive strains therefrom;
    first and second spaced-apart links each having their ends connected to said first and second bases through respective flexure hinges, said flexure hinges being positioned to define a rectangle having a first axis of symmetry intersecting said first and second links, and a second axis of symmetry extending perpendicularly to said first axis of symmetry;
    measurement means for measuring relative movement between said first and second bases directed generally parallel to said first axis of symmetry;
    a pair of mounting points on said first base, said mounting points being symmetrically positioned with respect to said second axis of symmetry; and
    at least one mounting point on said second base, all mounting points on said second base being symmetrically positioned with respect to said second axis of symmetry such that said extensometer can measure the load-induced stress in said structural member along a measurement axis while being insensitive to isotropic stress in said structural member by mounting said extensometer on said structural member through said mounting points with said axes of symmetry intersecting said measurement axis at substantially 45°.

2. The extensometer of claim 1, further including an intermediate flexure hinge connecting said first link to one of said bases intermediate the ends of said first link such that said first link bends responsive to relative movement between said bases directed generally parallel to said first axis of symmetry, and wherein said measurement means includes a strain sensor mounted on said first link between said intermediate flexure hinge and a flexure hinge connecting said first link to said one base, said strain sensor generating an electrical ouput responsive to bending of said first link resulting from relative movement between said bases directed generally parallel to said first axis of symmetry.

3. The extensometer of claim 2 wherein said strain sensor comprises a pair of strain gauges bonded to surfaces of said first link on opposite sides of the neutral bending axis of said first link.

4. The extensometer of claim 2 wherein said strain sensor is applied to a portion of said first link having a reduced width in order to concentrate the strain of said first link at said strain sensor.

5. The extensometer of claim 2 wherein said bases and links are integrally formed from a unitary rectangular plate by a first slot extending along one edge of said plate to form said second link, a second slot extending along the edge of said plate opposite said first slot to form said first link, and a third slot extending along an edge of said plate intermediate said first and second slots to form said bases, said third slot intersecting the adjacent end of said first slot while being isolated from said second slot by a relatively small distance in order to form said intermediate flexure hinge.

6. The extensometer of claim 5, further including a pair of cutouts extending outwardly from said first slot adjacent each end thereof to a point close to the adjacent edge of said plate in order to form the flexure hinges of said second link, and a pair of cutouts extending inwardly toward said second slot from the adjacent edge of said plate, one of said cutouts extending to a point close to the end of said second slot distal from said third slot, and the other of said cutouts extending to a point close to the other end of said second slot in order to form the flexure hinges of said first link.

7. The sensor of claim 5, further including a mounting hole positioned at each corner of said plate.

8. The extensometer of claim 1 wherein said measurement means includes a measurement beam extending between said links and a strain sensor mounted on said measurement beam to provide an electrical output indicative of the pivotal movement of said links resulting from relative movement between said bases directed generally parallel to said first axis of symmetry.

9. The extensometer of claim 8 wherein said measurement beam has a longitudinal axis that is generally parallel to said first axis of symmetry.

10. The extensometer of claim 8 wherein said measurement beam has a longitudinal axis that is coincident with said first axis of symmetry.

11. The extensometer of claim 8 wherein said second base contains two mounting points lying along a line that is generally parallel to said first axis of symmetry and substantially equidistant from said second axis of symmetry.

12. The extensometer of claim 8 wherein said second base contains a single mounting point positioned on said second axis of symmetry.

13. The extensometer of claim 8 wherein said measurement beam includes first and second beam sections cantilevered respectively from said first and second links, and connected to each other through a flexure hinge, one of said beam sections being substantially more compliant than the other to provide a relatively large amount of bending in the relatively compliant beam section, said strain sensor being mounted on said relatively compliant beam section.

14. The extensometer of claim 13 wherein said relatively compliant beam section has a transverse dimension tapering inwardly toward said less compliant beam section.

15. The extensometer of claim 14 wherein said relatively compliant beam section has an area of reduced thickness on which said strain sensor is mounted to concentrate bending of said beam section at the location of said strain sensor.

16. The extensometer of claim 1, further including mounting means for securing said bases to said structural member, comprising:
    a rigid plate;
    a plurality of pins each extending between said plate and one of said bases at a respective mounting point, said pins being sufficiently compliant in the transverse direction to permit relative movement between said bases directed generally parallel to said first axis of symmetry in response to load-induced stress in said structural member, while said plate is held stationary relative to said structural member, said mounting means further including a pointed projection from each mounting point on the surfaces of said bases opposite said plate; and a fastener extending from said plate through an aperture in at least one of said bases and into said structural member to draw said plate toward said structural member and force said pointed projections against said structural member, said aperture being sized sufficiently large to allow relative movement between said bases and said fastener, thereby forcing said pointed projections against said structural member while allowing said bases to move relative to said plate and fastener.

17. The extensometer of claim 16 wherein said fastener extends through said aperture at a point substantially equidistant from said mounting points.

18. An extensometer comprising:
a base member having a pair of spaced-apart mounting points lying along a line that is parallel to an axis of symmetry, said base member being attachable to a structural member by said base member mounting points;
a mounting bar having a pair of spaced-apart mounting points lying along a line that is parallel to said axis of symmetry, said mounting bar being attachable to said structural member by said mounting bar mounting points;
a spacer arm extending perpendicularly between said base member and said mounting bar with its ends connected thereto through respective flexure hinges;
a measurement beam extending parallel to said spacer arm and having its ends connected to said base member and mounting bar through respective flexure hinges, said measurement beam being connected to said base member at a point intermediate its ends through an intermediate flexure hinge; and
strain-sensing means mounted on said measurement beam between said intermediate flexure hinge and the flexure hinge connecting said measurement beam to said base member, said strain-sensing means generating an electrical output responsive to deformation of said measurement beam, whereby said strain-sensing means generates an output responsive to relative movement between said base member and said mounting bar directed generally parallel to said axis of symmetry, with said base member and said mounting bar being movable by forces applied to said mounting points by said structural member in response to load-induced stress in said structural member.

19. The extensometer of claim 18 wherein said strain-sensing means comprise a pair of strain gauges bonded to the surfaces of said measurement beam on opposite sides of the neutral bending axis of said beam.

20. The extensometer of claim 18 wherein said strainsensing means are applied to a portion of said measurement beam having a reduced width in order to concentrate the strain of said measurement beam at said strain-sensing means.

21. The extensometer of claim 18 wherein said base member, mounting bar, spacer arm and measurement beam are integrally formed from a unitary, generally rectangular plate by a first slot extending along one edge of said plate to form said spacer arm, a second slot extending along the edge of said plate opposite said first slot to form said measurement beam, and a third slot extending along an edge of said plate intermediate said first and second slots to form said mounting bar, said third slot intersecting the adjacent end of said first slot while being isolated from said second slot by a relatively small distance in order to form said intermediate flexure hinge.

22. The extensometer of claim 21, further including an pair of cutouts extending perpendicularly outwardly from said first slot adjacent each end thereof to a point close to the adjacent edge of said plate in order to form the flexure hinges of said spacer arm and a pair of cutouts extending perpendicularly inwardly toward said second slot from the adjacent edge of said plate, one of said cutouts extending to a point close to the end of said second slot distal from said third slot, and the other of said cutouts extending to a point close to the other end of said second slot in order to form the flexure hinges for said measurement beam.

23. The extensometer of claim 21, further including a mounting hole positioned at each corner of said plate.

24. A system for measuring the load-induced strain along a measurement axis in a load-bearing structure while being insensitive to isotropic strains in said structure, said system comprising an extensometer mounted on said structure through two mounting bases, with said bases being mechanically coupled to a single measurement beam in a manner causing said beam to deflect in one direction responsive to a load-induced strain of one polarity applied between said bases along said measurement axis and causing said beam to deflect in the opposite direction responsive to a load-induced strain of said one polarity applied between said bases along an axis that is orthogonal to said measurement axis, and in a manner causing no deflection in said measurement beam responsive to isotropic stress in said structure, such that said measurement beam deflects responsive to load-induced strains but is unaffected by isotropic strains.

25. The measuring system of claim 24 wherein said extensometer includes first and second spaced-apart links each having their ends connected between said mounting bases through respective flexure hinges, said flexure hinges being positioned to generally define a rectangle having a first axis of symmetry intersecting said first and second links, and a second axis of symmetry extending generally perpendicularly to said first axis of symmetry;
measurement means for measuring deflection of said measurement beam responsive to relative movement between said mounting bases directed generally parallel to said first axis of symmetry;
a pair of mounting points on one of said mounting bases, said mounting points being symmetrically positioned with respect to said second axis of symmetry; and
at least one mounting point on the other of said mounting bases, all mounting points on said other mounting base being symmetrically positioned with respect to said second axis of symmetry, said extensometer being mountable on said structure through said mounting points with said axes of symmetry intersecting said measurement axis at substantially 45° such that strains of one polarity applied to said mounting bases through said mounting points along said measurement axis and strains of the opposite polarity applied to said mounting bases through said mounting points along an axis orthogonal to said measurement axis cause said measurement means to respond in the same polarity, while isotropic strains applied to said mounting bases through said mounting points along said measurement axis and along said axis orthogonal to said measurement axis counteract each other.

26. The measuring system of claim 37 wherein said mounting bases and links are integrally formed from a unitary, generally rectangular plate by a first slot extending along one edge of said plate to form said second link, a second slot extending along the edge of said plate opposite said first slot to form said first link, and a third slot extending along an edge of said plate intermediate said first and second slots to form said mounting bases, said third slot intersecting the adjacent end of said first slot while being isolated from said second slot by a relatively small distance in order to form an intermediate flexure hinge connecting said measurement beam to said one mounting base at a point intermediate the ends of said measurement beam.

27. The measuring system of claim 25 wherein said measurement beam extends between said links, and said measurement means includes a strain sensor mounted on said measurement beam to provide an electrical output indicative of the pivotal movement of said links resulting from relative movement between said mounting bases directed generally parallel to said first axis of symmetry.

28. The measuring system of claim 24, further including mounting means for securing said mounting bases to said load-bearing structure, comprising:
 a rigid plate;
 a plurality of pins each extending between said plate and one of said mounting bases at a respective mounting point, said pins being sufficiently compliant in the transverse direction to permit relative movement between said mounting bases directed generally parallel to said first axis of symmetry while said plate is held stationary relative to said load-bearing structure, said mounting means further including at least one pointed projection extending from the surface of each of said mounting bases opposite said plate; and
 a fastener extending from said plate beyond said mounting bases, and into said load-bearing structure to draw said plate toward said structure and force said pointed projections against said structure, said mounting bases being uninhibited by said fastener to allow relative movement therebetween in response to load-induced stress in said structure, thereby forcing said pointed projections against said structure while allowing said mounting bases to move relative to said plate and fastener.

29. A temperature-insensitive strain sensor generating a strain-indicative electrical signal, said strain sensor comprising an extensometer that is strain sensitive along two orthogonal axes, the strain imparted to said extensometer along said axes being mechanically coupled to a single sensing beam in such a way that strain of one polarity along the first axis generates a positive signal and strain of the same polarity along the second axis generates a negative signal of substantially the same magnitude so that said extensometer is substantially insensitive to isotropic expansion or contraction of a structural member on which said extensometer is mounted, said extensometer including first and second mounting bases adapted for mounting on said structural member to receive strains therefrom, first and second spaced-apart connecting links having their respective ends connected to said first and second bases through respective flexure hinges, said hinges being substantially arranged in a rectangle having a first axis of symmetry intersecting said first and second links and a second axis of symmetry extending perpendicularly to said first axis of symmetry such that said bases are relatively compliant to permit relative movement between said bases directed generally parallel to said first axis of symmetry and thereby cause said flexure hinges to move toward a parallelogram configuration, said sensing beam extending between said links and having a longitudinal axis that is generally parallel to said first axis of symmetry, said beam having a strain sensor mounted thereon and providing an electrical output indicative of the pivotal movement of said links resulting from the strain in said structural member.

30. A mounting system for securing an extensometer having at least two sensing plates movable relative to each other to measure load-induced stress in a structure by at least three contact points, comprising:
 a rigid bearing plate;
 a plurality of pins each extending between said bearing plate and said sensing plates at a respective contact point, said pins being sufficiently compliant in the transverse direction to permit relative movement between said sensing plates in response to load-induced stress in said structure while said bearing plate is held stationary relative to said structure:
 a pointed projection extending from each of said contact points on the surface of said sensing plates opposite said bearing plate, said pointed projections being sufficiently rigid to transmit strain on said structure to said sensing plates;
 a fastener extending from said bearing plate through an aperture in said extensometer and into said structure to draw said bearing plate toward said structure and apply a force on said pins to move said pointed projections against said structure, said aperture being sized sufficiently large to allow relative movement between said sensing plates and said fastener resulting from load-induced stress in said structure, thereby forcing said pointed projections against said structure while allowing said extensometer to move relative to said substantially stationary bearing plate and fastener.

31. The mounting system of claim 30 wherein said fastener extends through said extensometer aperture at a point substantially equidistant from said contact points.

32. A method of measuring the magnitude of a load applied to a load-bearing structure along a measurement axis which is substantially insensitive to isotropic strains in said structure, said method comprising mounting an extensometer on said structure, said extensometer having an output that is proportional to the magnitude of relative movement between a pair of mounting bases along an axis of sensitivity, each of said mounting bases being mounted on said structure through at least one mounting point, with all mounting points on each base being symmetrically located with respect to an axis of symmetry of said extensometer extending generally perpendicularly to said axis of sensitivity, said extensometer being mounted on said structure with said axis of sensitivity intersecting said measurement axis at 45°.

33. The method of claim 32 wherein said extensometer comprises:

a spacer arm extending between said mounting bases with its ends connected thereto through respective flexure hinges, said spacer arm having a longitudinal axis extending perpendicular to said axis of sensitivity;

a measurement beam extending parallel to said spacer arm and having its ends connected to said mounting bases through respective flexure hinges, said measurement beam being connected to one of said mounting bases at a point intermediate said ends through an intermediate flexure hinge; and strain-sensing means mounted on said measurement beam between said intermediate flexure hinge and the flexure hinge connecting said measurement beam to one of said mounting bases, said strain-sensing means generating an electrical output responsive to deformation of said measurement beam, whereby said strain-sensing means generates an output responsive to loadinduced strains in said structure along said measurement axis but is substantially insensitive to isotropic strains in said structure.

34. The method of claim 32 wherein said extensometer comprises:

first and second spaced-apart links each having their ends connected to each of said mounting bases through respective flexure hinges, said flexure hinges being positioned to generally define a rectangle having said axis of sensitivity intersecting said first and second links;

a measurement beam extending between said links, said measurement beam having a longitudinal axis that is generally parallel to said axis of sensitivity;

a strain sensor mounted on said measurement beam to provide an electrical output indicative of the pivotal movement of said links resulting from relative movement between said mounting bases directed generally parallel to said axis of sensitivity;

a pair of mounting points on one of said mounting bases, said mounting points being symmetrically positioned with respect to said axis of symmetry; and at least one mounting point on said other mounting base, all mounting points on said mounting base being symmetrically positioned with respect to said axis of symmetry, said extensometer being mounted on said structure with said axis of sensitivity intersecting said measurement axis at substantially 45°, thereby measuring the loadinduced stress in said structure along said measurement axis while being insensitive to isotropic strains in said structure.

35. The method of claim 34 wherein each of said mounting bases contains two mounting points lying along a respective line that is generally parallel to said axis of sensitivity and equidistant from said axis of symmetry.

36. The method of claim 34 wherein one of said mounting bases contains a single mounting point positioned on said axis of symmetry.

37. The measuring system of claim 24 wherein said measurement beam comprises a first link, and said extensometer further includes a second link spaced-apart from said first link, said links each having their ends connected between said mounting bases through respective flexure hinges, said flexure hinges being positioned to generally define a rectangle having a first axis of symmetry intersecting said first and second links, and a second axis of symmetry extending generally perpendicularly to said first axis of symmetry;

measurement means for measuring deflection of said measurement beam responsive to relative movement between said mounting bases directed generally parallel to said first axis of symmetry;

a pair of mounting points on one of said mounting bases, said mounting points being symmetrically positioned with respect to said second axis of symmetry; and at least one mounting point on the other of said mounting bases, all mounting points on said other mounting base being symmetrically positioned with respect to said second axis of symmetry, said extensometer being mountable on said structure through said mounting points with said axes of symmetry intersecting said measurement axis at substantially 45° such that strains of one polarity applied to said mounting bases through said mounting points along said measurement axis and strains of the opposite polarity applied to said mounting bases through said mounting points along an axis orthogonal to said measurement axis cause said measurement means to respond in the same polarity, while isotropic strains applied to said mounting bases through said mounting points along said measurement axis and along said axis orthogonal to said measurement axis counteract each other.

38. The mounting system of claim 30 wherein said pin and said pointed projection at each contact point are integrally formed as a unitary pin member, each pin member being rigidly attached by one end to said bearing plate and extending through an aperture in one of said sensing plates, said sensing plates being positionable adjacent to said structure.

* * * * *